United States Patent Office 3,060,642
Patented Oct. 30, 1962

3,060,642
MEANS FOR GENERATING INVOLUTE GEARS
Peter H. Cleff, Gosforth, Newcastle-upon-Tyne, England, assignor to The Parsons and Marine Engineering Turbine Research and Development Association, Wallsend, England
Filed Sept. 12, 1960, Ser. No. 55,321
Claims priority, application Great Britain Sept. 28, 1959
7 Claims. (Cl. 51—32)

This invention relates to means for generating involute gears. Its principal object is to provide, in connection with the manufacture of high precision involute spur or helical gears, improved means whereby the gear tooth flanks, having been pre-cut by one of the well known machining processes such as hobbing or planing, may be finished to a high degree of accuracy in the desired profile by a profile generating process employing a rotatably driven generating wheel such as a grinding wheel.

In the generating process, the grinding wheel is guided with an oscillating motion over a distance sufficient to cover the depth of tooth required, basically in such a way that the operative face generatrix of said grinding wheel envelopes, as a line curve, a true circular involute developed from the gear base circle of radius $R_0$ or a high order approximation thereto, during either the first or second half, or both halves of its cycle of movement. Means is also provided for modifying the path of the wheel so that simultaneously with the basic curve, the grinding wheel produces tooth profile modifications such as tip and/or root relief.

A flat sided grinding wheel with line contact between the tooth flank being ground and said wheel, may be used when producing a tooth profile without tip and/or root relief, or helix corrections in the case of helical gears since there is then no risk of damage to the previously ground portions of the tooth flank due to said line contact. For producing a modified involute profile, i.e. one having either tip and/or root relief, or helix angle corrections a cone-shaped wheel making point contact with the flank of a work piece tooth is preferred, in order to eliminate that risk. The invention will be particularly described hereinafter with reference to such a cone-shaped wheel because of its greater utility.

It will be clear that in order to grind over the whole flank of a spur or helical gear tooth and repeat the operation on successive teeth, further correlated movements must be imparted to the grinding wheel and/or the work piece. One object of the present invention is to provide an improved gear generating machine in which all the required operative movements, i.e. cutting, generation of profile and feed, are imparted to the generating or grinding wheel, while the work piece (a pinion or gear wheel suitably precut and heat treated) remains stationary when grinding one spur gear tooth flank, or rotates slowly in timed relation with the feed motion of the grinding head when grinding one helical gear tooth profile. Upon completion of one tooth flank the work piece is indexed for the next tooth flank to be brought into the correct grinding position relative to the path of generation of the grinding wheel, and this process is continued until all tooth flanks of a particular gear have been ground.

The essential part of such a machine provided by the invention is a grinding head, incorporating the generating wheel and its associated guiding mechanism, and complying with the requirement that all the components of said head—except the operative part of the generating wheel—must be located and must operate entirely outside the space occupied by the work piece. The remaining part of the machine e.g. the bed, column, work table, and indexing arrangements for the work piece, may be constructed according to known practice in the art.

It has already been proposed to generate an involute profile by the controlled generative movement of a straight-line generatrix preferably represented by a portion of the cone generatrix of a straight circular cone grinding or generating wheel, employing a composite generating movement of the grinding wheel for the generation of a circular involute by an infinite number of successive tangent positions of the cone generatrix of said grinding wheel. This composite generating motion consists of an oscillation of the grinding wheel round an axis parallel to, and a certain distance "$R_0+a$" away from, the axis of the work piece and a correlated rectilinear and always parallel reciprocating movement of said axis of oscillation along a line parallel to, and a certain distance "$a$" away from, the tangent to the workpiece base circle of radius "$R_0$" at the point of intersection of the centre line of machine and workpiece with said base circle.

Figure 5:
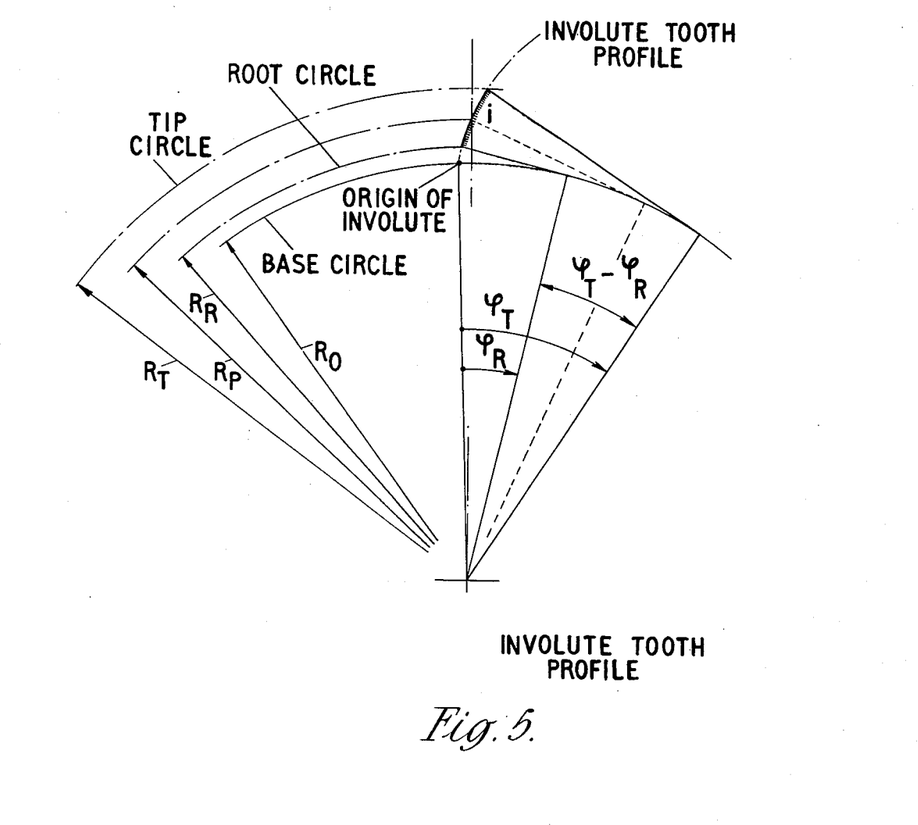
Figure 6:
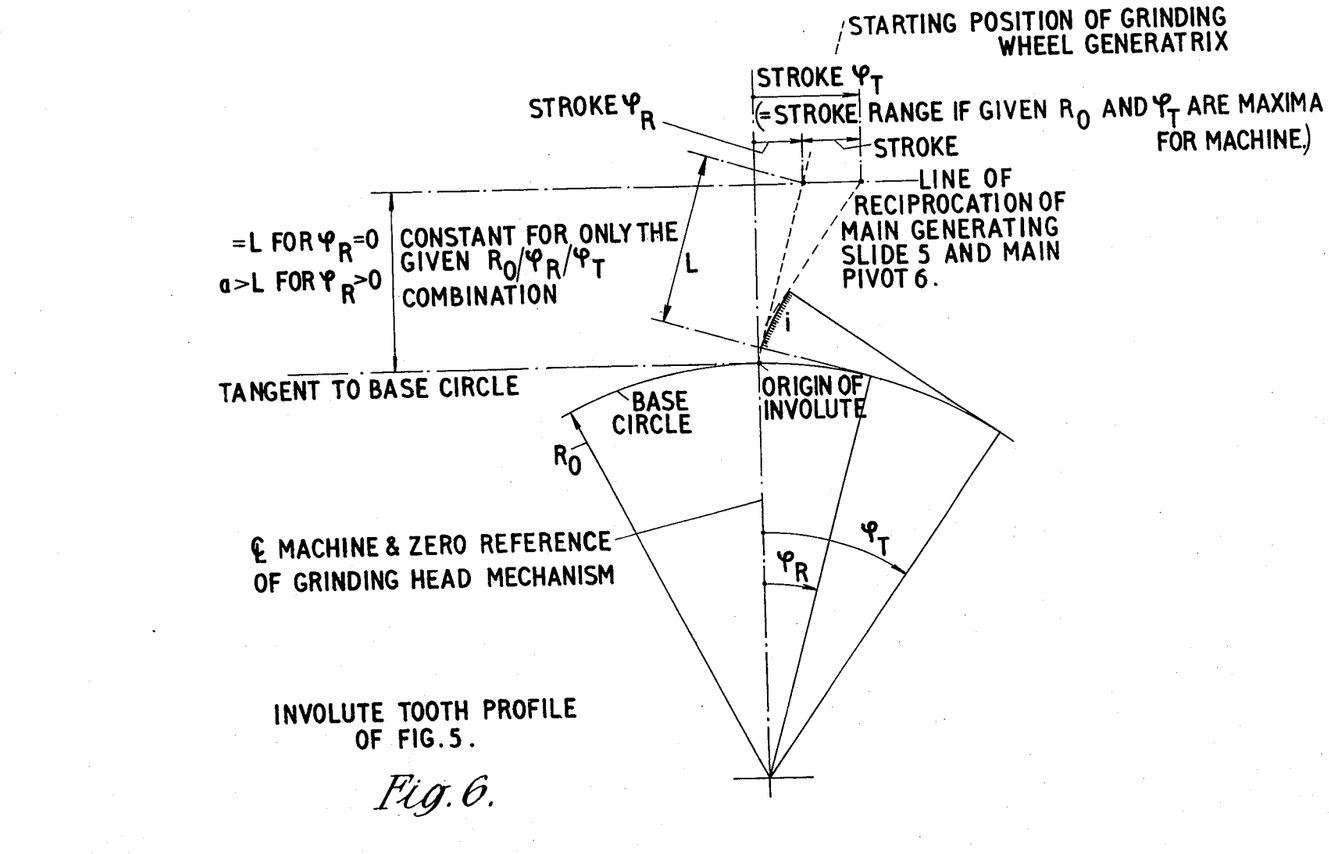
Figure 7:
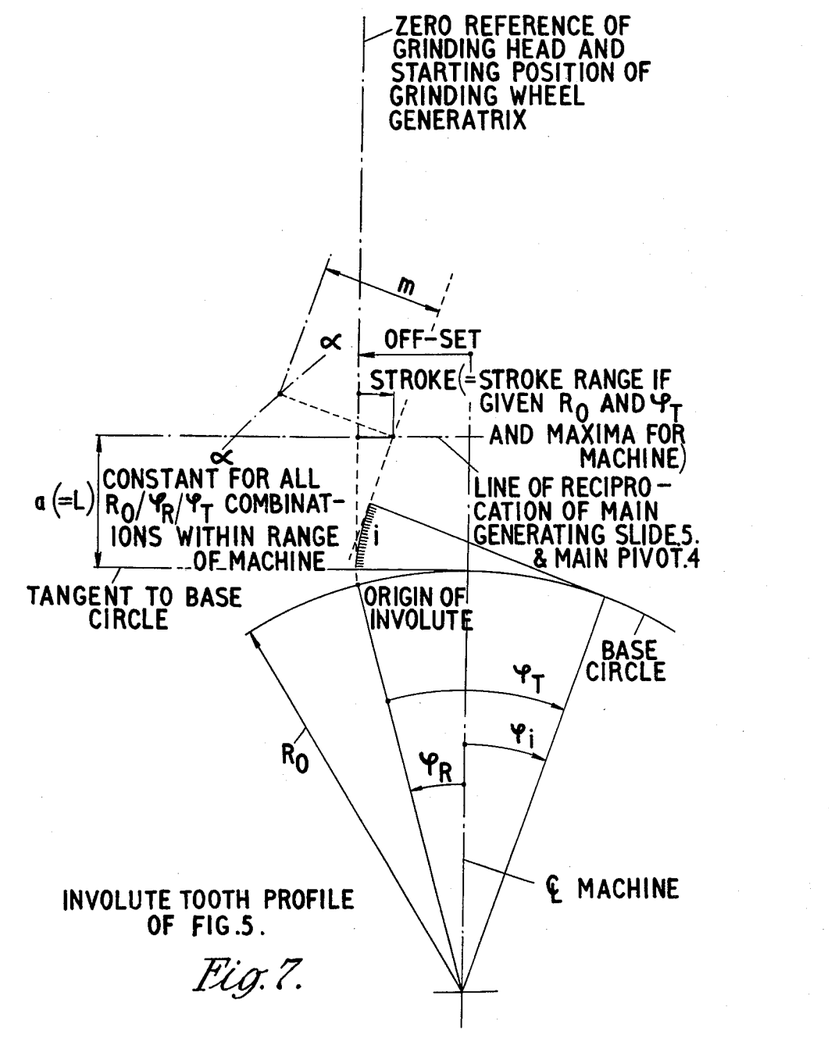

According to this prior proposal and in order to produce an involute gear tooth profile as indicated in FIGURE 5 by the set-up shown in FIGURE 6, of the accompanying drawings, regardless of the values of $\varphi_R$ and $\varphi_T$, the reference or zero position of the grinding head mechanism must always coincide with the centre line of machine and workpiece. This mode of operation results in three distinct disadvantages.

(a) The greater $\varphi_R$ the greater will be the starting point angularity of the generating mechanism. This in turn may lead to unfavourable angularities, i.e. transmission angles, between the various links and slides of said generating mechanism over the required operational range $\varphi_R/\varphi_T$.

(b) The numerical value of "$a$" must be varied for different values of $\varphi_R$ when, as is normally the case, the length "$L$" from main pivot 4 to the outside rim of the grinding wheel is kept constant. For this condition of "$L$"=const. the change in "$a$" must be made in order (i) To avoid grinding wheel interference with the root fillet between adjacent teeth when said grinding wheel is in its $\varphi_R$— position, and (ii) To obtain full coverage of the developed length $\frac{1}{2}R_0(\varphi_T{}^2-\varphi_R{}^2)$ of the tooth profile by the limited radial depth of the grinding wheel cone available.

For given values of $R_0$, $\varphi_R$ and $L$ the magnitude of "$a$" can be computed from $$a = R_0 [\cos \varphi_R + \varphi_R \sin \varphi_R - 1] + L \cos \varphi_R$$

(c) Owing to the necessity for kinematic reasons of always having to work from the invariant zero position of the grinding head mechanism (which as already pointed out is coincident with the machine centre line) a rather large main slide stroke range is required for a given $R_0/\varphi_R/\varphi_T$ range of workpieces even though the generating stroke for a particular work gear may be comparatively small. Thus, for a 30/90 inch base circle diameter machine and a standard range of pitches, the stroke range would have to be approximately 9.8 inch although the maximum stroke for a particular gear within the given range would never be much greater than about 2.25 inch. With "$a$" as defined above the necessary generative travel $t_g$ of the main slide in case of the gear illustrated in FIGURE 6 would be $$t_g = [a \tan \varphi_T - R_0 \sec \varphi_T(\varphi_T - \sin \varphi_T)]$$
$$- [a \tan \varphi_R - R_0 \sec \varphi_R(\varphi_R - \sin \varphi_R)]$$

It will be noted that in every normal case the actual generative travel is the difference "Travel for $\varphi_T$ minus Travel for $\varphi_R$" with both values being computed for the zero position of the grinding head mechanism (=centre line of machine) as origin. Only for $\varphi_R=0$ will the starting ($\varphi_R$) position of the grinding wheel generatrix coincide with the machine centre line and the equation for the actual travel reduce to one term only, i.e. Actual Travel=Travel for $$\varphi_T = a.\tan \varphi_T - R_0 \sec \varphi_T(\varphi_T - \sin \varphi_T)$$

For $\varphi = 0$

In accordance with the present invention employing the basic principle illustrated in FIGURES 1 to 4 and FIGURE 7 of the drawings the travel for $\varphi_R$ is always zero and the actual generative main slide travel is only dependent on $\varphi_1$ in the range $\varphi_R \leq \varphi_1 \leq \varphi_T - \varphi_R$ with $\varphi_R$ introduced as a constant in the form $\varphi_0$. Thus the actual travel in this case is $$t_g = a \tan \varphi_1 - R_0 \sec \varphi_1[(\varphi_1 - \sin \varphi_1) + \varphi_0(1 - \cos \varphi_1)]$$

for $\varphi_1 = 0$ to $\varphi_1 = \varphi_T - \varphi_R$.

From the above it follows that for a given length "L" as defined previously, the distance "a" can now be made a real constant for all sizes of workpiece within the range of a machine because the starting position of the grinding wheel generatrix will always, and regardless of the value for $\varphi_R$ ($=\varphi_0$), be parallel to the machine centre line though Off-Set to the distance $R_0\varphi_0$ from it. No danger of fillet interference exists and no unfavourable angularities can occur in the generating mechanism, even though the same angular oscillation ($\varphi_T - \varphi_R = \varphi_1$) must be imparted to the grinding spindle holding member (swing frame) because $\varphi_R$ is always made zero by means of the Off-Set. Consequently the grinding wheel generatrix is always normal to the base circle tangent as defined earlier, when the grinding wheel is in the starting position for the outward half ($\varphi_1 = 0$ to $\varphi_1 = \varphi_T - \varphi_R$) of a full profile generating cycle ($\varphi_1 = 0$ to $\varphi_1 = \varphi_T - \varphi_R$ to $\varphi_1 = 0$).

Another advantage achieved by the present invention lies in the means provided for establishing the correct correlation between the reciprocating and oscillating components for the generating motion of the grinding wheel.

In the prior proposal this correlation is achieved by a step-by-step mechanisation of $$a.\tan \varphi - R_0 \sec \varphi(\varphi - \sin \varphi)$$

i.e. first by an $a.\tan \varphi$ mechanism, then $$a - R_0(\tan \varphi - \sin \varphi)/n$$

mechanism and finally an angular type corrector mechanism such that $-R_0(\tan \varphi - \sin \varphi)/n$ is transformed into $-R_0 \sec \varphi(\varphi - \sin \varphi)$ via $-R_0(\tan \psi - \sin \psi)/n$ in which latter $\psi$ is given by the relationship $$1 - \cos \psi = n(\varphi \csc \varphi - 1)$$

Figure 1:
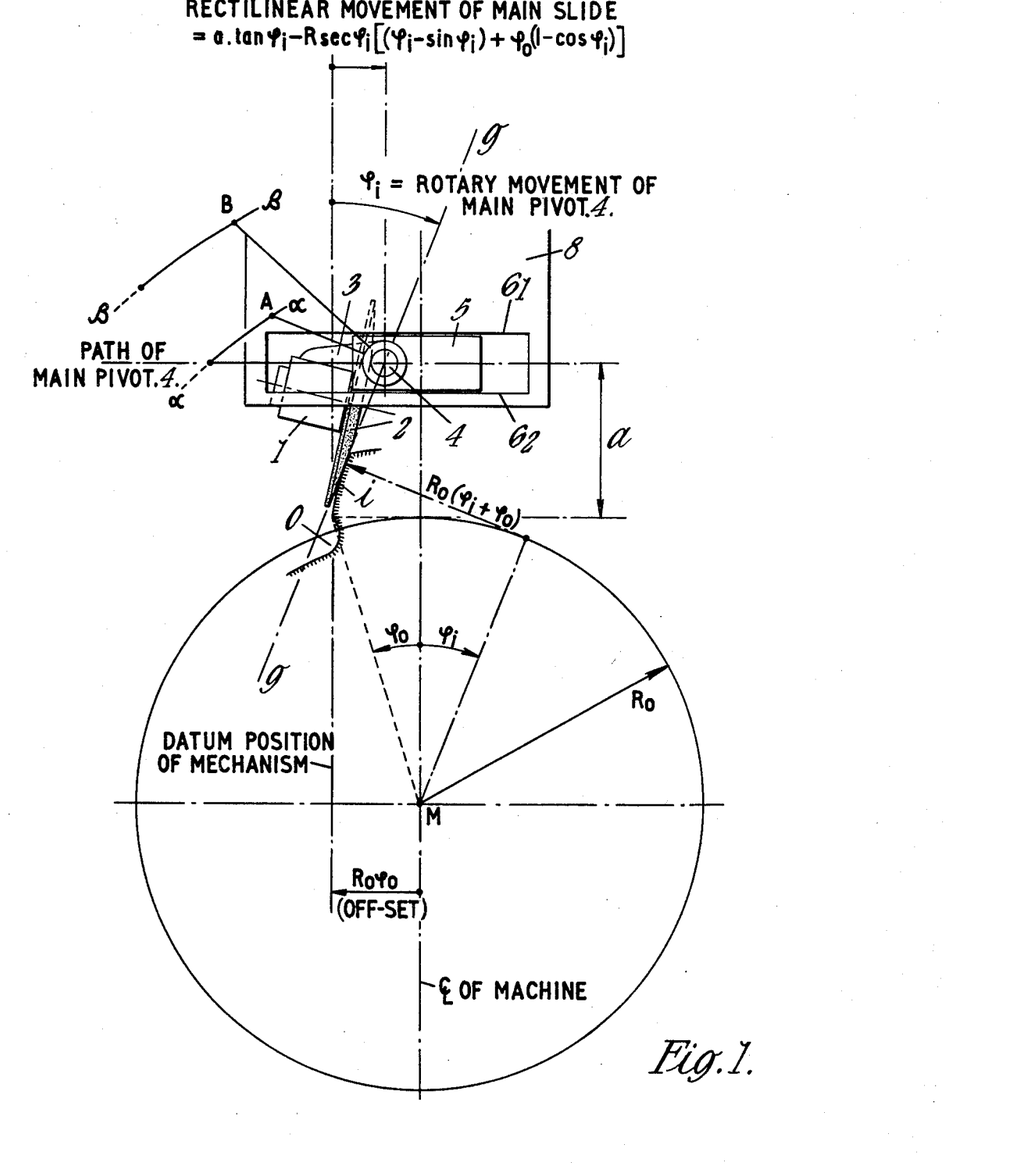
Figure 2:
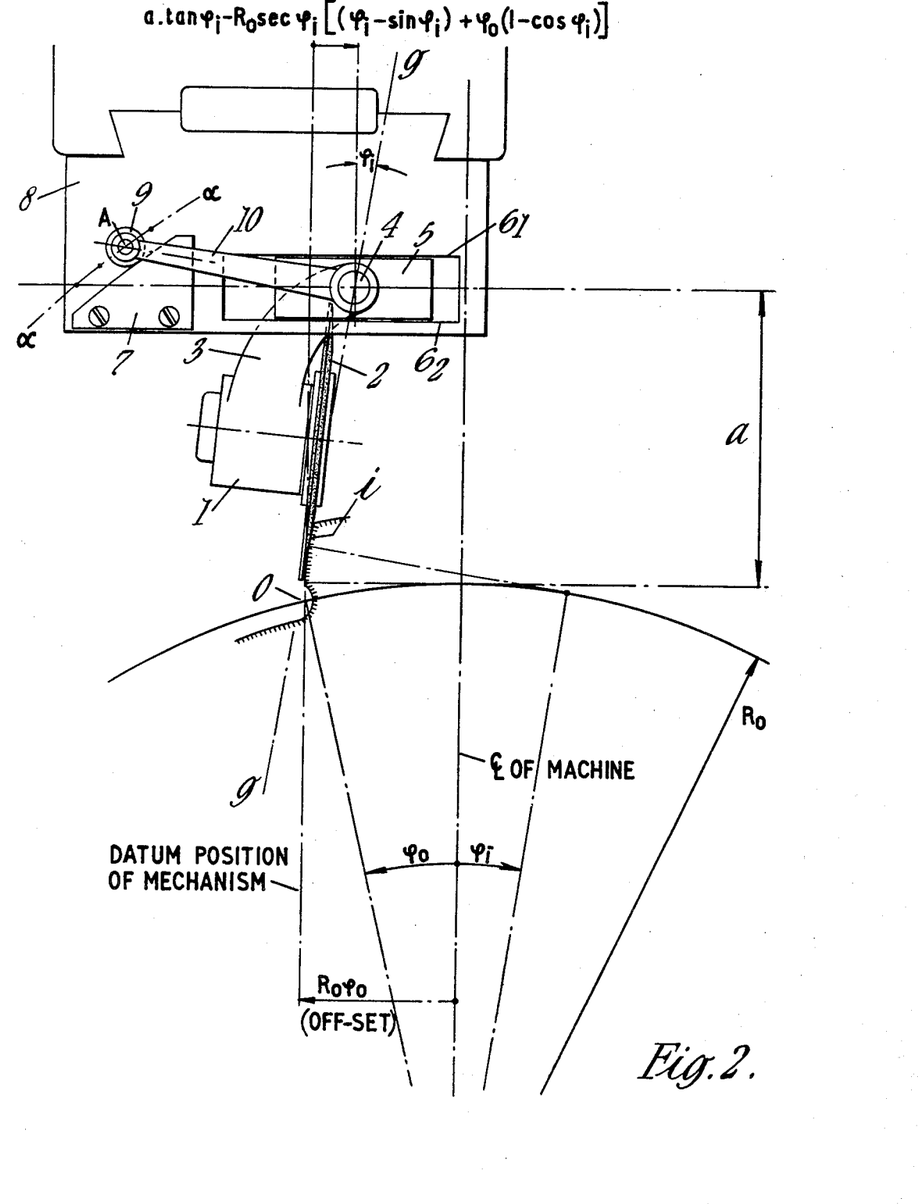
Figure 3:
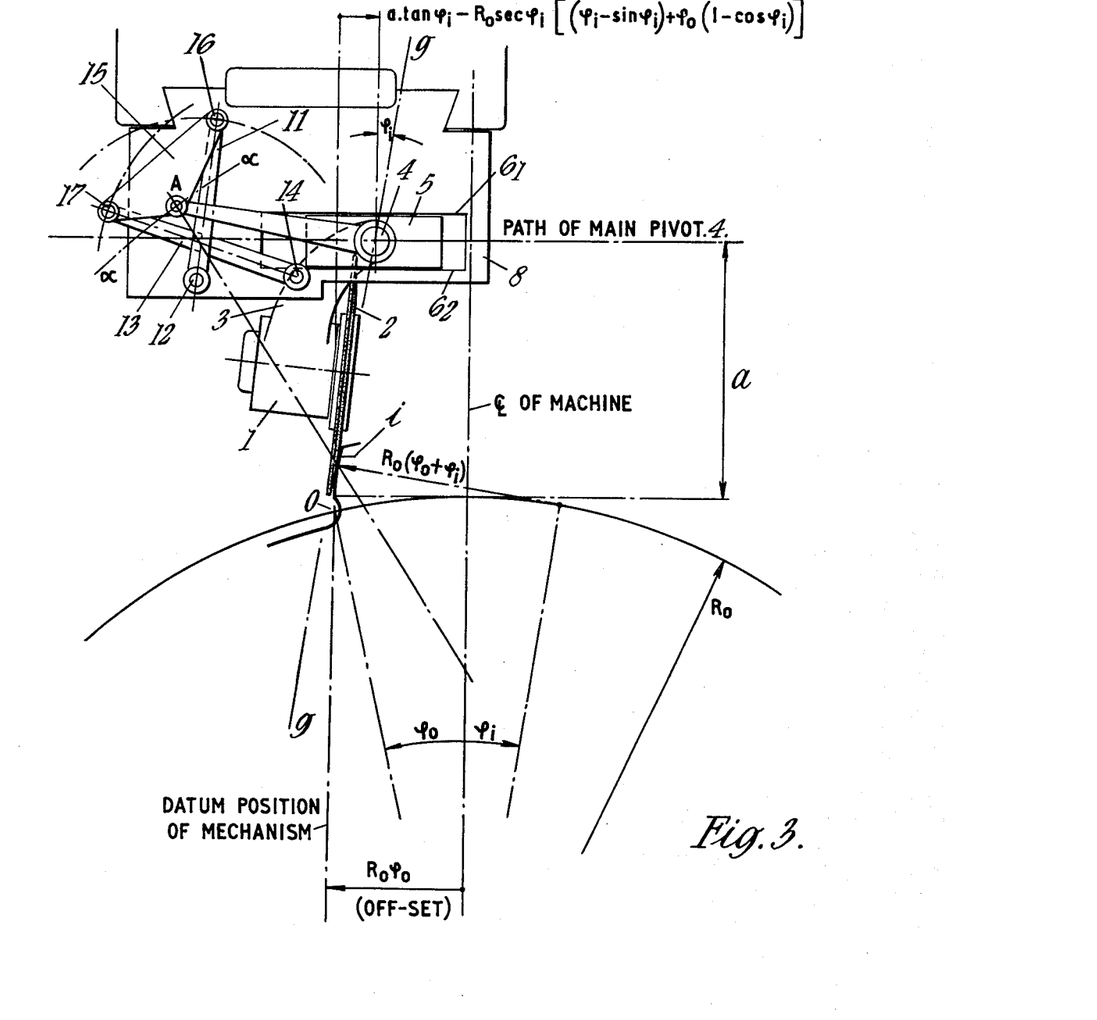
Figure 4:
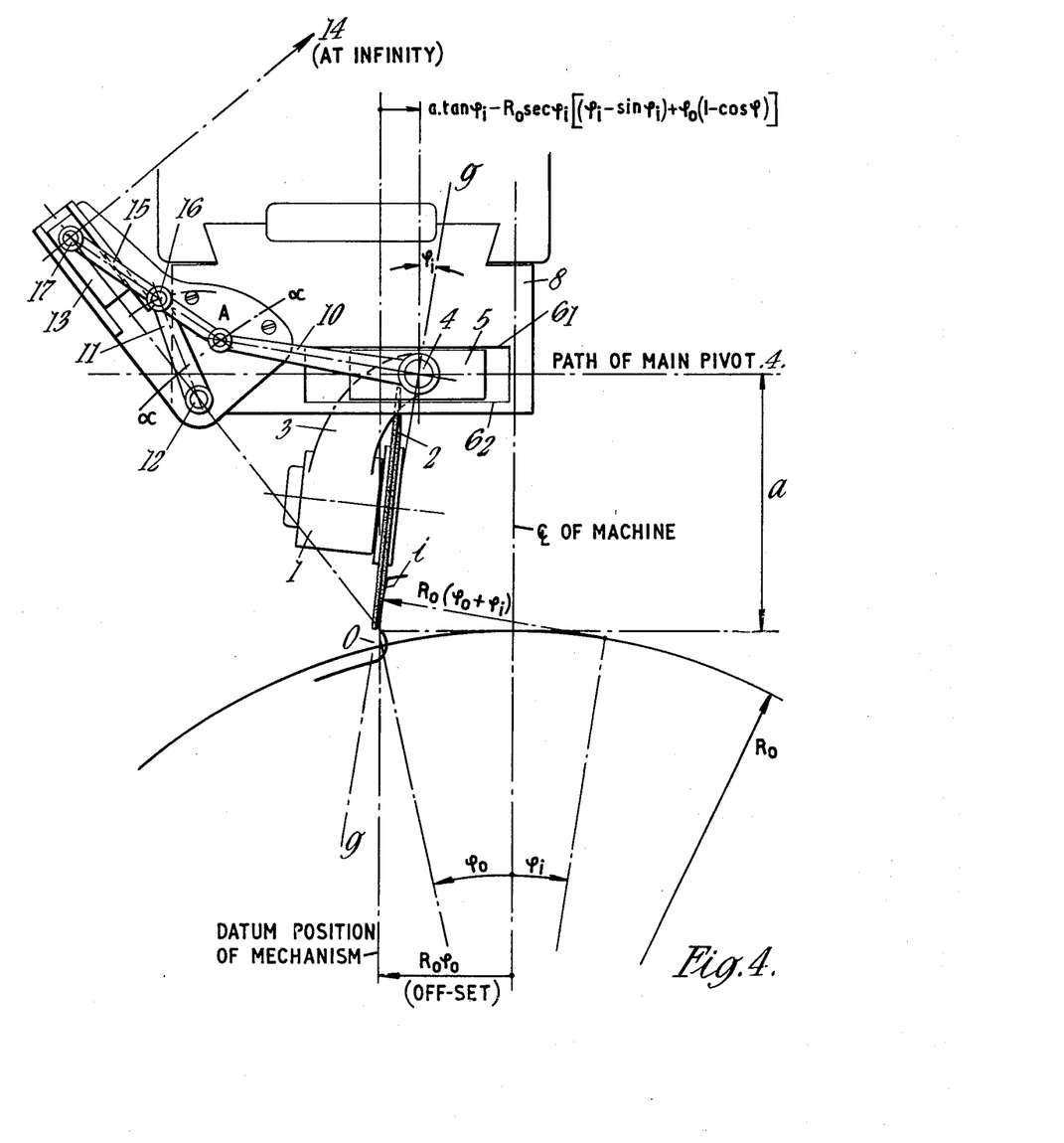

The present invention employs a much more direct way in that the equations representing the path of pivot A in FIGURES 1–4 and FIGURE 7 are mechanised in toto by the linkages shown, for example, in FIGURES 2, 3 and 4.

The direct mechanisation of the parametric equations for the path of A, namely $$X_A = a \tan \varphi_1 - R_0 \sec \varphi_1[(\varphi_1 - \varphi_1) + \varphi_0(1 - \cos \varphi_1)]$$
$$+ m(1 - \cos \varphi_1) Y_A = m \sin \varphi_1$$

has the great advantage of reducing the number of kinematic pairs as shown in the following comparative list:

|  | Present invention | Prior proposal |
|---|---|---|
| No. of cylinder pairs | 5 | 8 |
| No. of sliding pairs | 2 | 3 |
| No. of cam pairs | None | 1 |
| Total number of kinematic pairs | 7 | 12 |

This reduction of almost 46.2% in the number of kinematic pairs means of course greater simplicity, less cost, higher accuracy, less moving masses and hence the possibility of higher operating speeds resulting in shorter grinding times, greater reliability and longer life.

Another great advantage attained by the present invention lies in the fact that the actual profile generating mechanism is now no longer so dependent on "a" as is the prior proposal. In the prior proposal there exists a definite lower limit for "a" on account of the $a.\tan \varphi$ mechanism whose operating characteristics would be adversely affected if "a" were made too small in relation to the inertia torques induced by the oscillating spindle holding member during high-speed operation. With the present invention on the other hand, the distance "a" can be made as small as is compatible with the overall design and thus bring about a substantial reduction in main slide generating stroke for a given set of work gear values $R_0/\varphi_R/\varphi_T$.

A further advantage of the present invention lies in the fact that because $\varphi_R$ is always made zero by Off-Setting the grinding head, the ratio "stroke range/max. stroke" can be reduced to a maximum of 1.100 as compared with a value of at least 4.4 for a machine of 30/90″ capacity according to the prior proposal. In consequence the physical size of a grinding head can be greatly reduced.

Yet another advantage of the present invention is the possibility of unit construction for the correlator mechanism, e.g. the slider crank mechanism in FIGURE 4. By having two such units per grinding head, one of them could always be made ready for a new job and checked whilst the other was still working. A substantial saving in setting-up time could thus be achieved.

According to the invention a head for an involute gear generating machine comprises a rotatable spindle adapted to carry a generating wheel, such as a grinding wheel, having a flat or cone-shaped operative face, mounted in a spindle-holding member and angularly movable therewith about a main pivot axially normal to and co-planar with the generatrix of the generating wheel and also parallel to the axis of the gear to be ground the main pivot being mounted on a main slide slidable on a rectilinear main guide adapted to be positioned perpendicularly to the gear axis so that the rectilinear path of the main pivot lies a distance "$R_0+a$" from the gear axis and is parallel to and distance "a" away from the tangent to the workpiece base circle of radius "$R_0$" at the point of intersection of the centre line of machine and workpiece with said base circle and means for correlating the said angular and rectilinear movements so that, from a datum position off-set by an amount $\varphi_0R_0$ from said centre line an angular movement $\varphi_1$ of the spindle-holding member is accompanied by a rectilinear movement $$a.\tan \varphi_1 - R_0 \sec \varphi_1[(\varphi_1 - \sin \varphi_1) + \varphi_0(1 - \cos \varphi_1)]$$

or a high order approximation thereto, of the main pivot slide, whereby the said generatrix is a generatrix also of a true or nearly true involute developed from the gear base circle of radius $R_0$.

In order that the invention may be more fully understood it will now be described by way of example with reference to FIGURES 1 to 4 of the drawings.

Referring to FIGURE 1, a rotatable spindle 1 carrying a grinding wheel 2 having a cone-shaped operative face with an apex angle of between 150° to 178°, is mounted in a spindle holding member 3 and is angularly movable therewith about a main pivot 4 axially normal to and co-planar with the generatrix "gg" of the operative face of the grinding wheel (as the latter rotates). The main pivot 4 is journalled in a main slide 5 slidable in rectilinear guide ways $6_1$—$6_2$ positioned perpendicularly to the axis M of a gear having a base circle radius $R_0$, so that the rectilinear path of the main pivot 4 lies a mutually perpendicular distance "$R_0+a$" from the gear axis M.

In the datum position the main pivot 4 will generally lie a certain distance $R_0\varphi_0$ away from the vertical centre line of the figure. Only in cases where the involute tooth profile has to be ground right down to its origin "O" on the base circle will this datum position coincide with the vertical centre line.

From FIGURE 1 it will be seen that when the angular and rectilinear movements of the grinding wheel around pivot axis 4 and along guide ways $6_1$—$6_2$ respectively are correlated so that from the datum position an angular movement $\varphi_i$ is accompanied by a rectilinear movement $a.\tan \varphi_i - R_0 \sec \varphi_i[(\varphi_i - \sin \varphi_i) + \varphi_0(1 - \cos \varphi_i)]$ then the generatrix "$gg$" will be a generatrix also of an involute $i$ developed from origin O on the base circle $R_0$.

It will also be seen that as a result of the correlated movements just described any point in a plane perpendicular to the axis of pivot 4 and rigidly attached to said pivot will describe a curved path relative to the stationary main frame of the grinding head. Thus, point A will describe path $\alpha$—$\alpha$ point B a different path $\beta$—$\beta$, and so forth.

One mode of carrying the invention into effect is illustrated in FIGURE 2 embodying a master cam 7 equidistantly curved to the shape of path $\alpha$—$\alpha$ of point A, this cam 7 being fixed rigidly to the stationary main frame 8 of the grinding head. The desired correlation between angular and rectilinear movements of the grinding wheel can be obtained in a very simple manner if a roller 9 mounted at A and at one end of a lever 10 whose other end is integrally attached to and movable with pivot 4, is always constrained to move in contact with the cam 7 whilst the main slide 5 is reciprocated along its rectilinear guide ways $6_1$—$6_2$ thus oscillating the spindle holding member 3 carrying grinding spindle 1.

This method may profitably be employed for the construction of a grinding head designed to produce very large numbers of identical gears in two or three different sizes, so that only two or three different master cams will be required.

However, for a machine designed to deal effectively with a wide range of different gears, a grinding head operating on the principle just outlined would be prohibitively expensive to run as each gear would require its own specific master cam.

An arrangement of the four-bar linkage type for overcoming this drawback is illustrated in FIGURE 3 in which an adjustable crank 11 is pivoted at 12 on a main frame 8, an adjustable lever 13 is also pivoted on the main frame 8 at 14, and an adjustable coupling link 15 is pivotally joined to the crank 11 and lever 13 at their respective pivots 16 and 17. The pivot A of the lever 10 is adjustably located on the coupling link 15.

Provided the correct link dimensions have been chosen—which includes the positions of the pivots 12 and 14 with respect to the main guide ways $6_1$—$6_2$, the mechanism will guide the pivot A along path $\alpha$—$\alpha$ and thus establish the correct correlation between angular and linear movements already referred to, i.e. $\varphi_i$ for pivot 4 and $a.\tan \varphi_i - R_0 \sec \varphi_i[(\varphi_i - \sin \varphi_i) + \varphi_0(1 - \cos \varphi_i)]$ for slide 4.

Different link dimensions will give different paths for the pivot A and they can be calculated to suit any type of gear within the design range of the machine.

In order to reduce the number of settings required for a particular work gear—which is rather large in the case of general four-bar link mechanisms and necessitates a considerable amount of complex computations—less complicated versions of the same basic mechanism may be used. One of these, by way of example, is illustrated in FIGURE 4. It is a slider crank mechanism, i.e. a four-bar linkage in which the lever 13 is of infinite length and thus constrains the pivot 17 to move in a rectilinear path.

Generally speaking, any type of link-mechanism, link-plus-cam mechanism, link-plus-roll curve mechanism etc., may be used provided it is sufficiently simple to adjust for different sizes of work gear, is robust and reliable in service and can satisfy the conditions specified in the seventh paragraph of this specification.

I claim:
1. A gear generating machine head comprising a rotatable spindle carrying a generating wheel, and mounted in a spindle-holding member and angularly movable therewith about a main pivot axially normal to and co-planar with the generatrix of the generating wheel and also parallel to the axis of the gear to be ground, the main pivot being mounted on a main slide slidable on a rectilinear main guide adapted to be positioned perpendicularly to the gear axis so that the rectilinear path of the main pivot lies a distance "$R_0 + a$" from the gear axis and is parallel to and distance "$a$" away from the tangent to the workpiece base circle of radius "$R_0$" at the point of intersection of the centre line of machine, which is defined as the straight line passing through the axis of a work table and intersecting the rectilinear path of the main pivot under a right angle, with said base circle and means for correlating the said angular and rectilinear movements so that, from a datum position off-set by an amount $\varphi_0 R_0$ from said centre line, an angular movement $\varphi_i$ of the spindle-holding member is accompanied by a rectilinear movement

$$a.\tan \varphi_i - R_0 \sec \varphi_i[(\varphi_i - \sin \varphi_i) + \varphi_0(1 - \cos \varphi_i)]$$

of the main pivot slide, whereby the said generatrix is a generatrix also of a true involute developed from the gear base circle of radius $R_0$.

2. A gear generating machine head as claimed in claim 1 in which the means for correlating angular and rectilinear movements comprise a fixed cam of predetermined contour engaged by a roller rotatably mounted at one end of a lever whose other end is integrally attached to and movable with the main pivot of the spindle holding member carrying the generating wheel spindle.

3. A gear generating machine head as claimed in claim 1 in which for the correlation of angular and linear movements a four-bar linkage is employed comprising an adjustable crank and an adjustable lever both pivoted at one end to a main frame, an adjustable coupling link pivoted to the other ends of said crank and lever and a drive connection between said coupling link and the spindle holding member by means of a lever whose one end is pivotally connected to said coupling link whilst the other is integrally attached to and movable with the main pivot of said spindle holding member carrying the generating wheel spindle.

4. A gear generating machine head as claimed in claim 1 in which for the correlation of angular and rectilinear movements an adjustable crank is pivoted at one end to a fixed frame and at the other end to an intermediate point on a coupling link one end of which is restrained to move in a fixed rectilinear path and the other end of which is pivoted to one end of a lever whose other end is integrally attached to and movable with the main pivot of the spindle holding member carrying the generating wheel spindle.

5. A gear generating head as claimed in claim 1 whereing said generating wheel comprises a grinding wheel having a flat operative face.

6. A gear generating head as claimed in claim 1 wherein said generating wheel comprises a grinding wheel having a cone shape.

7. A gear generating machine head comprising a rotatable spindle carrying a generating wheel and mounted in a spindle-holding member and angularly movable therewith about a main pivot axis normal to and co-planar with the generatrix of the generating wheel and also parallel to the axis of the gear to be ground, the main pivot being mounted on a main slide slideable on a rectilinear main guide adapted to be positioned perpendicularly to the gear axis so that the rectilinear path of the main pivot lies a distance "$R_0 + a$" from the gear axis and is parallel to and distant "$a$" away from the tangent to the workpiece base circle of radius "$R_0$" at the point of intersection of the centre line of the machine and workpiece, which is defined as the straight line passing through the axis of a work table and intersecting the rectilinear path of the main pivot under a right angle, with said base circle and means for co-relating the said angular and rectilinear movements so that, from a datum position offset by an amount $\varphi_0 R_0$ from said centre line an angular movement $\varphi_1$ of the spindle holding member is accompanied by a rectilinear main pivot slide movement of a high order approximation to $a.\tan \varphi_i - R_0 \sec \varphi_i [(\varphi_i - \sin \varphi_i) + \varphi_0(1 - \cos \varphi_i)]$ whereby the said generatrix is a generatrix also of a high order approximation to a true involute developed from the gear base circle of radius $R_0$.

References Cited in the file of this patent

UNITED STATES PATENTS 2,888,784  Cleff _____________________ June 2, 1959